United States Patent
Abe (10) Patent No.: US 8,254,630 B2
(45) Date of Patent: Aug. 28, 2012

(54) SUBJECT EXTRACTING METHOD AND DEVICE BY ELIMINATING A BACKGROUND REGION USING BINARY MASKS

(75) Inventor: Hiroyuki Abe, Yokohama (JP)

(73) Assignee: Nikon Corporation, Tokyo (JP)

( * ) Notice: Subject to any disclaimer, the term of this patent is extended or adjusted under 35 U.S.C. 154(b) by 849 days.

(21) Appl. No.: 12/226,663

(22) PCT Filed: Apr. 23, 2007

(86) PCT No.: PCT/JP2007/058739
§ 371 (c)(1), (2), (4) Date: Oct. 24, 2008

(87) PCT Pub. No.: WO2007/125866
PCT Pub. Date: Nov. 8, 2007

(65) Prior Publication Data
US 2009/0141937 A1 Jun. 4, 2009

(30) Foreign Application Priority Data
Apr. 28, 2006 (JP) ................................. 2006-125202

(51) Int. Cl.
*G06K 9/00* (2006.01)
*G06K 9/40* (2006.01)

(52) U.S. Cl. .......................... 382/103; 382/283; 382/260

(58) Field of Classification Search ................... 382/103, 382/162, 272, 172, 283, 260, 232, 274, 275, 382/282; 358/462, 515, 518; 348/14.08, 348/14.13; 345/691, 694; 375/240.29, 254
See application file for complete search history.

(56) References Cited

U.S. PATENT DOCUMENTS

| 6,690,822 B1 * | 2/2004 | Chen et al. ..................... 382/162 |
| 7,319,780 B2 * | 1/2008 | Fedorovskaya et al. ...... 382/128 |
| 7,916,905 B2 * | 3/2011 | Yen et al. ....................... 382/118 |

(Continued)

FOREIGN PATENT DOCUMENTS

| JP | A-7-306483 | 11/1995 |
| JP | A-8-98184 | 4/1996 |

(Continued)

OTHER PUBLICATIONS

Marius et al., "Face Detection Using Color Thresholding, and Eigenimage Template Matching," *Web Archive for Stanford University*, Jun. 3, 2003, pp. 1-17, <http://web.archive.org/web/20040622165909/http://www.stanford.edu/class/ee368/Project_03/project_03.html>.

(Continued)

*Primary Examiner* — Vikkram Bali
*Assistant Examiner* — Nancy Bitar
(74) *Attorney, Agent, or Firm* — Oliff & Berridge, PLC (57) ABSTRACT

A binary mask image for extracting subject is generated by binarizing an image after image-processing (processed image) with a predefined threshold value. Based on an image before image-processing (pre-processing image) and the binary mask image for extracting image, a subject image in which only a subject included in the pre-processing image is extracted is generated by eliminating a background region from the pre-processing image.

29 Claims, 8 Drawing Sheets

U.S. PATENT DOCUMENTS

| | | | |
|---|---|---|---|
| 2002/0093670 A1* | 7/2002 | Luo et al. | 358/1.9 |
| 2007/0195174 A1* | 8/2007 | Oren | 348/222.1 |
| 2008/0285853 A1* | 11/2008 | Bressan | 382/169 |
| 2008/0292201 A1* | 11/2008 | Dumitras et al. | 382/260 |

FOREIGN PATENT DOCUMENTS

| | | | |
|---|---|---|---|
| JP | A-11-224327 | | 8/1999 |
| JP | 2002-190029 | * | 7/2002 |
| JP | A-2002-190029 | | 7/2002 |
| JP | A-2003-216955 | | 7/2003 |
| JP | A-2004-159211 | | 6/2004 |
| JP | A-2005-293334 | | 10/2005 |
| JP | A-2006-157817 | | 6/2006 |

OTHER PUBLICATIONS

Gottumukkal et al., "Real Time Face Detection from Color Video Stream Based on PCA Method," *Proceedings of the 32nd Applied Imagery Pattern Recognition Workshop*, Oct. 15, 2003, pp. 146-150, IEEE.

Supplementary European Search Report for Corresponding European Patent Application No. 07742174.1, mailed on Oct. 14, 2010.

Oct. 4, 2011 Office Action issued in Japanese Patent Application No. 2008-513191 (with English Translation).

* cited by examiner

SUBJECT EXTRACTING METHOD AND DEVICE BY ELIMINATING A BACKGROUND REGION USING BINARY MASKS

TECHNICAL FIELD

The present invention relates to a subject extracting method for extracting a subject image from an image, a subject tracking method for tracking the extracted subject image between frames, an image synthesizing method for synthesizing the extracted subject image with other image, a computer program for extracting subject, a computer program for tracking subject, a computer program for synthesizing images, a subject extracting device, a subject tracking device, and an image synthesizing device.

BACKGROUND ART

A method for detecting a face region in an image is known in the related art, which estimates the size of the face from magnification set for the shooting and calculates the size of a skin-colored region in the image. This method allows a region of the face to be detected in the image by comparing the estimated face size and the skin-colored region size (refer to patent reference literature 1).

Patent reference literature 1: Japanese Laid Open Patent Publication No. H07-306483

DISCLOSURE OF THE INVENTION

Problems to be Solved by the Invention

According to the conventional method, the size of face is estimated from magnification set for the shooting. The size of face in an image, however, varies also depending on the distance between the camera and the subject. So, the size estimated from magnification set for the shooting is not always precise. An error in the estimation value may have resulted in inaccurate detection of the face region.

Means for Solving the Problems

A subject extracting method according to a 1st aspect of the present invention generates a binary mask image for extracting subject by binarizing an image after image-processing (processed image) with a predefined threshold value; and based on an image before image-processing (pre-processing image) and the binary mask image for extracting subject, generates a subject image in which only a subject included in the pre-processing image is extracted by eliminating a background region from the pre-processing image.

According to a 2nd aspect of the present invention, in the subject extracting method according to the 1st aspect, it is preferable that the binary mask image is generated with one of a density mean value and a density median of the processed image as the predefined threshold value.

According to a 3rd aspect of the present invention, in the subject extracting method according to the 1st or 2nd aspect, it is preferable that the pre-processing image is an image represented in an RGB color space; a luminance image including luminance components and a chrominance image including chrominance components are generated according to the pre-processing image; the binary mask image is generated with each of the luminance image and the chrominance image as the post-processed image; and one binary mask image selected using a predetermined evaluation value from a binary mask image of the luminance image and a binary mask image of the chrominance image is determined as the binary mask image for extracting subject.

According to a 4th aspect of the present invention, in the subject extracting method according to the 3rd aspect, it is preferable that a color space comprising the luminance components and the chrominance components is a YCbCr color space.

According to a 5th aspect of the present invention, in the subject extracting method according to the 3rd aspect, it is preferable that a color space comprising the luminance components and the chrominance components is a YIQ color space.

According to a 6th aspect of the present invention, in the subject extracting method according to any of the 3rd through 5th aspect, it is preferable that the predetermined evaluation value includes a moment of inertia about a center of mass of the binary mask image of the luminance image and a moment of inertia about a center of mass of the binary mask image of the chrominance image.

According to a 7th aspect of the present invention, in the subject extracting method according to any of the 3rd through 5, it is preferable that the predetermined evaluation value includes a value obtained by dividing an area of white region in the luminance image by a moment of inertia about a center of mass of the binary mask image of the luminance image and a value obtained by dividing an area of white region in the chrominance image by a moment of inertia about a center of mass of the binary mask image of the chrominance image.

According to a 8th aspect of the present invention, in the subject extracting method according to any of the 1st through 7th, it is preferable that the subject image is an image obtained by a logical conjunction of the pre-processing image and the binary mask image for extracting subject.

A subject tracking method according to a 9th aspect of the present invention generates an input subject image in which only a subject included in an input image is extracted by eliminating a background from each frame of the input image using a subject extracting method according to any of the 1st through 8th aspect; and tracks a movement of a subject between frames in the input image according to similarity between a template image and the input subject image.

A subject tracking method according to a 10th aspect generates a template subject image in which only a subject included in a template image is extracted by eliminating a background from the template image using a subject extracting method according to any of the 1st through 8th aspect; generates an input subject image in which only a subject included in an input image is extracted by eliminating a background from each frame of the input image using a subject extracting method according to any of the 1st through 8th aspect; and tracks a movement of a subject between frames in the input image according to similarity between the template subject image and the input subject image.

According to a 11th aspect of the present invention, in the subject tracking method according to the 10th aspect, it is preferable that the template image is an image represented in an RGB color space; a luminance image including luminance components and a chrominance image including chrominance components are generated according to the template image; a binary mask image is generated by binarizing the luminance image and the chrominance image with one of a density mean value and a density median of each of the luminance image and the chrominance image as a threshold value; one binary mask image is selected using a predetermined evaluation value from a binary mask image of the luminance image and a binary mask image of the chrominance image as a binary mask image for template; and an image obtained by a logical conjunction of the template image and the binary mask image for template is determined as the template subject image.

According to a 12th aspect of the present invention, in the subject tracking method according to the 11th aspect, it is preferable that the input image is an image represented in an RGB color space; a component image including a same component as in a binary mask image selected as the binary mask image for template is generated based on the input image; a binary mask image for input image is generated by binarizing the component image with one of a density mean value and a density median of the component image as a threshold value; and an image obtained by a logical conjunction of the input image and the binary mask image for input image is determined as the input subject image.

According to a 13th aspect of the present invention, in the subject tracking method according to the 12th aspect, it is preferable that a moment of inertia of the template subject image about a center of mass of the binary mask image for template is determined as a feature quantity for the template subject image; a moment of inertia of the input subject image about a center of mass of a predetermined region set in the binary mask image for input image is determined as a feature quantity of the input subject image; and a similarity between the template subject image and the input subject image is calculated based on the feature quantity of the template subject image and the feature quantity of the input subject image.

An image synthesizing method according to a 14th aspect of the present invention specifies an extraction position of a subject in a first image extracted from the first image using a subject extracting method according to any one of claims 1 through 8 in the first image; generates a subject image in which only a subject is extracted from a second image using a subject extracting method according to any of the 1st through 8th aspect; and synthesizes the subject image generated from the second image into the extraction position of the subject in the first image.

A computer program for extracting subject according to a 15th aspect of the present invention executes the following steps of (a) and (b):
(a) a binary mask image generation step that generates a binary mask image for extracting subject by binarizing an image after image-processing (processed image) using a predetermined threshold value; and
(b) a subject image generation step that generates, based on an image before image-processing (pre-processing image) and the binary mask image for extracting subject, a subject image in which a background region is eliminated from the pre-processing image and only a subject included in the pre-processing image is extracted.

According to a 16th aspect of the present invention, in the computer program for extracting subject according to the 15th aspect, it is preferable that, in the binary mask image generation step, the binary mask image is generated using one of a density mean value and a density median of the processed image as the predetermined threshold value.

According to a 17th aspect of the present invention, in the computer program for extracting subject according to the 15th or 16th aspect, it is preferable that the pre-processing image is an image represented in an RGB color space; and the binary mask image generation step generates a luminance image including luminance components and a chrominance image including chrominance components based on to the pre-processing image; generates the binary mask image with the luminance image and the chrominance image as the processed image respectively; and determines one binary mask image selected using a predetermined evaluation value from a binary mask image of the luminance image and a binary mask image of the chrominance image as the binary mask image for extracting subject.

According to a 18th aspect of the present invention, in the computer program for extracting subject according to the 17th aspect, it is preferable that a color space including the luminance components and the chrominance components is a YCbCr color space.

According to a 19th aspect of the present invention, in the computer program for extracting subject according to the 17th, it is preferable that a color space including the luminance components and the chrominance components is a YIQ color space.

According to a 20th aspect of the present invention, in the computer program for extracting subject according to any of the 17th through 19th, it is preferable that the predetermined evaluation value includes a moment of inertia about a center of mass of the binary mask image of the luminance image and a moment of inertia about a center of mass of the binary mask image of the chrominance image.

According to a 21st aspect of the present invention in the computer program for extracting subject according to any of the 17th through 19th aspect, it is preferable that the predetermined evaluation value includes a value obtained by dividing an area of white region in the luminance image by a moment of inertia about a center of mass of the binary mask image of the luminance image and a value obtained by dividing an area of white region in the chrominance image by a moment of inertia about a center of mass of the binary mask image of the chrominance image.

According to a 22nd aspect of the present invention, in the computer program for extracting subject according to any of the 15th through 21st aspect, it is preferable that, in the subject image generation step, an image obtained by a logical conjunction of the pre-processing image and the binary mask image for extracting subject is determined as the subject image.

A computer program for tracking subject according to a 23rd aspect of the present invention executes the following steps of (c) and (d):
(c) an input subject image generation step that performs a computer program for extracting subject according to any one of claims 15 through 22 so as to generate an input subject image in which a background is eliminated from each frame of an input image and only a subject included in the input image is extracted; and
(d) a subject tracking step that tracks a movement of a subject between frames in the input image based on a similarity between a template image and the input subject image.

A computer program for tracking subject according to a 24th aspect of the present invention executes the following steps of (e) to (g):
(e) a template subject image generation step that performs a computer program for extracting subject according to any one of claims 15 through 22 so as to generate a template subject image in which a background is eliminated from template image and only a subject included in the template image is extracted;
(f) an input subject image generation step that performs a computer program for extracting subject according to any one of claims 15 through 22 so as to generate an input subject image in which a background is eliminated from each frame of an input image and only a subject included in the input image is extracted; and (g) a subject tracking step that tracks a movement of a subject between frames in the input image based on a similarity between the template subject image and the input subject image.

According to a 25th aspect of the present invention, in the computer program for tracking subject according to the 24th aspect, it is preferable that the template image is an image represented in an RGB color space; and the template subject image generation step generates a luminance image including luminance components and a chrominance image including chrominance components based on the template image; generates a binary mask image by binarizing the luminance image and the chrominance image with one of a density mean value and a density median of each of the luminance image and the chrominance image as a threshold value; selects one binary mask image as a binary mask image for template using a predetermined evaluation value from a binary mask image of the luminance image and a binary mask image of the chrominance image; and determines an image obtained by a logical conjunction of the template image and the binary mask image for template as the template subject image.

According to a 26th aspect of the present invention, in the computer program for tracking subject according to the 25th aspect, it is preferable that the input image is an image represented in an RGB color space; and the input subject image generation step generates a component image including a same component as in a binary mask image selected as the binary mask image for template based on the input image; generates a binary mask image for input image by binarizing the component image with one of a density mean value and a density median of the component image as a threshold value; and determines an image obtained by a logical conjunction of the input image and the binary mask image for input image as the input subject image.

According to a 27th aspect of the present invention, in the computer program for tracking subject according to the 26th aspect, it is preferable that the subject tracking step determines a moment of inertia of the template subject image about a center of mass of the binary mask image of the template is a feature quantity for the template subject image; determines a moment of inertia of the input subject image about a center of mass of a predetermined region set in the binary mask image for input image as a feature quantity of the input subject image; and calculates a similarity between the template subject image and the input subject image based on the feature quantity of the template subject image and the feature quantity of the input subject image.

A computer program for synthesizing images according to a 28th aspect of the present invention executes the following steps of (h) to (j):
(h) a specifying step that performs a computer program for extracting subject according to any one of claims 15 through 22 so as to specify an extraction position of a subject extracted from a first image in the first image;
(i) a subject image generation step that performs a computer program for extracting subject according to any one of claims 15 through 22 so as to generate a subject image in which only a subject is extracted from a second image; and
(j) a synthesizing step that synthesizes the subject image generated from the second image into the extraction position of the subject in the first image.

A subject extracting device according to a 29th aspect of the present invention includes: a program execution device that performs a computer program for extracting subject according to any of the 15th through 22nd aspect.

A subject tracking device according to a 30th aspect of the present invention includes: a program execution device that performs a computer program for tracking subject according to any of the 23rd through 27th aspect.

An image synthesizing device according to a 31st aspect of the present invention includes: a program execution device that performs a computer program for synthesizing images according to the 28th aspect.

Advantageous Effect of the Invention

According to the present invention, a background region is eliminated from an image so as to precisely extract a subject image included in the image.

BRIEF DESCRIPTION OF THE DRAWINGS (FIG. 1) A block diagram of a configuration of a camera in accordance with an embodiment.

BEST MODE FOR CARRYING OUT THE INVENTION

Figure 1:
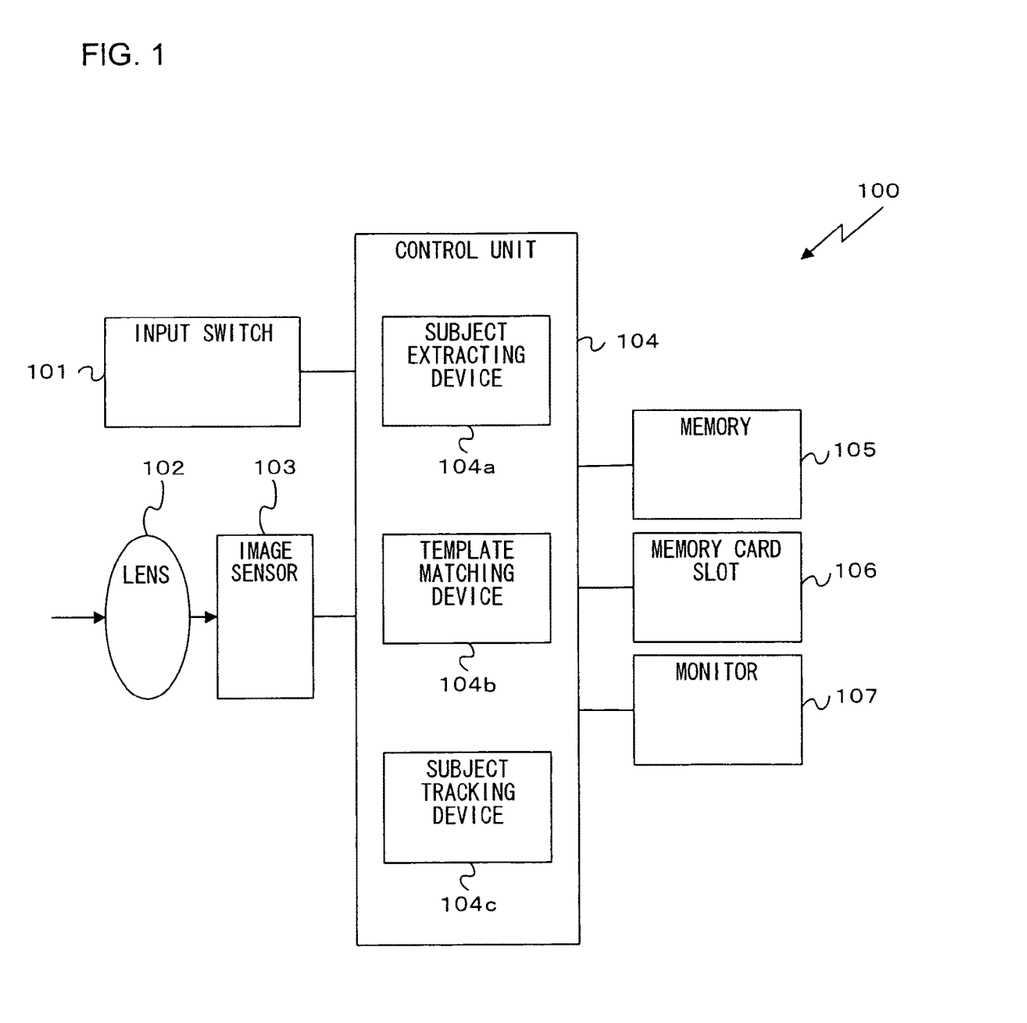

FIG. 1 is a block diagram of a configuration of a camera in accordance with an embodiment. A camera 100 is, for example, a digital camera. The camera 100 includes an input switch 101, a lens 102, an image sensor 103, a control unit 104, a memory 105, a memory card slot 106, and a monitor 107.

The input switch 101 includes a variety of input devices to be operated by a user such as a release switch and a variety of operation buttons for operating the camera 100.

The lens 102 includes a plurality of optical lenses. FIG. 1 shows one lens as a representative. The image sensor 103 is, for example, a CCD. The image sensor 103 captures a subject image input through the lens 102 and outputs obtained image data to the control unit 104. The obtained image data is a sort of image data to be expressed in an RGB color space. All color information of each color component of RGB exists in each pixel of the image data.

With respect to the camera 100 in accordance with the present embodiment, the image sensor 103 performs imaging of a subject in response to a user pressing down a release button included in the input switch 101. An image for one frame can be captured as a still image at the time when the release button is pressed down. On the other hand, a moving image can be taken by continuously imaging a subject for a plurality of frames at predefined intervals between when the release button is pressed down and when the release button is next pressed down.

The control unit 104 includes a CPU, a memory, and other peripheral circuits. The control unit 104 outputs image data (still image data or moving image data) input from the image sensor 103 to the monitor 107 for display, and stores the data in a memory card inserted in the memory card slot 106. The control unit 104 functionally includes a subject extracting device 104a, a template matching device 104b, and a subject tracking device 104c.

The subject extracting device 104a performs subject extracting processing on an image that includes a subject image captured in advance so as to generate a template subject image in which only the subject image is extracted from the image. The subject extracting device 104a performs subject extracting processing on image data of each frame which makes up a moving image data (input image) input from the image sensor 103 so as to generate an input subject image in which only the subject image is extracted from each of the frames. The template matching device 104b performs matching processing of each of the input subject images to a template subject image generated in advance. The subject tracking device 104c tracks the subject between frames according to matching result by the template matching device 104b. Processing executed by each of the devices 104a to 104c is now explained.

The subject extracting device 104a generates a template subject image to be used by the template matching device 104b for template matching processing. For this, the subject extracting device 104a extracts an image of region where the subject image is included as a template image from an image in which a subject image to be tracked for subject tracking processing described below is captured. Here, a subject to be tracked includes a face and a particular object.

For this, a user is required to prepare an image of the subject to be tracked and required to specify a region where the subject image is captured in the image as a region to be extracted for a template image. The image of the subject to be tracked may be an image selected from those already captured and stored in the memory card in the memory card slot 106, or may be a new image obtained through the image sensor 103.

The user displays the image including the face of the subject to be tracked which is prepared in advance on the monitor 107, and specifies the region to be extracted as a template image on the monitor 107 by operating the input switch 101. In the case where, for instance, a user specifies a region 2a which includes a face in the image shown in FIG. 2, the subject extracting device 104a extracts the image in the region 2a for a template image. In other words, the subject extracting device 104a extracts a template image shown in FIG. 3 from the image shown in FIG. 2. It should be noted that, as mentioned above, this template image is expressed in the RGB color system.

The subject extracting device 104a converts the template image in the RGB color system into a luminance image, which includes luminance components in the YCbCr color space, and a chrominance image, which includes chrominance components using the following equations (1) through (3). Specifically, the subject extracting device 104a generates a Y image which includes Y components as a luminance image using the following equation (1), and generates a Cb image which includes Cb components and a Cr image which includes Cr components as chrominance images respectively using the following equations (2) and (3).

$$Y=0.299R+0.587G+0.114B \quad (1)$$

$$Cb=-0.169R-0.332G+0.500B \quad (2)$$

$$Cr=0.500R-0.419G-0.081B \quad (3)$$

Figure 3:
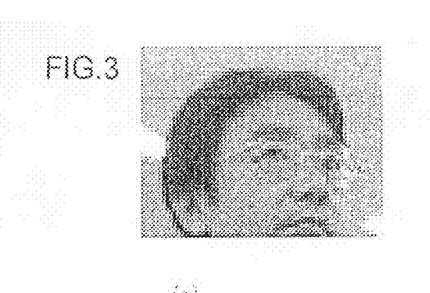
(FIG. 3) A figure showing an example of a template image.
Figure 4:
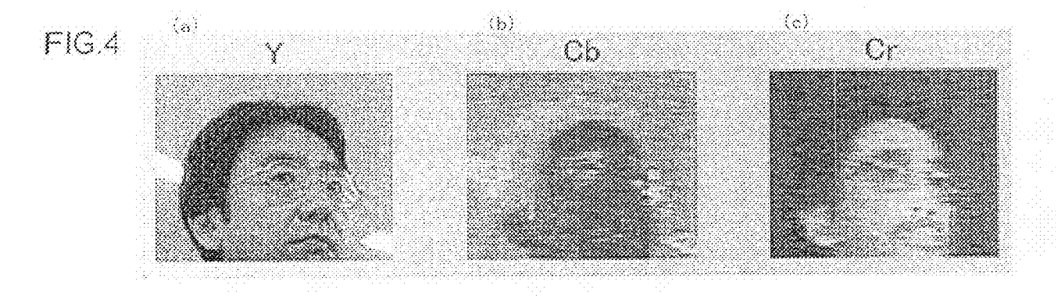
(FIG. 4) A figure showing examples of component images generated from the template image.

The template image in the RGB color space shown in FIG. 3 (pre-processing image) is thus converted into a Y image in FIG. 4(a), a Cb image in FIG. 4(b), and a Cr image in FIG. 4(c) (post-processed images) respectively. The subject extracting device 104a creates a density histogram with the density value (0-255) on the horizontal axis and the number of pixels on the vertical axis for the Y image, the Cb image, and the Cr image that are generated. In other words, with respect to each of the component images of the Y image, the Cb image, and the Cr image, the subject extracting device 104a checks the density value of all the pixels in the image, counts the number of pixels for each density value, and creates a density histogram indicating frequency of occurrence of the number of pixels for each density value.

Figure 5:
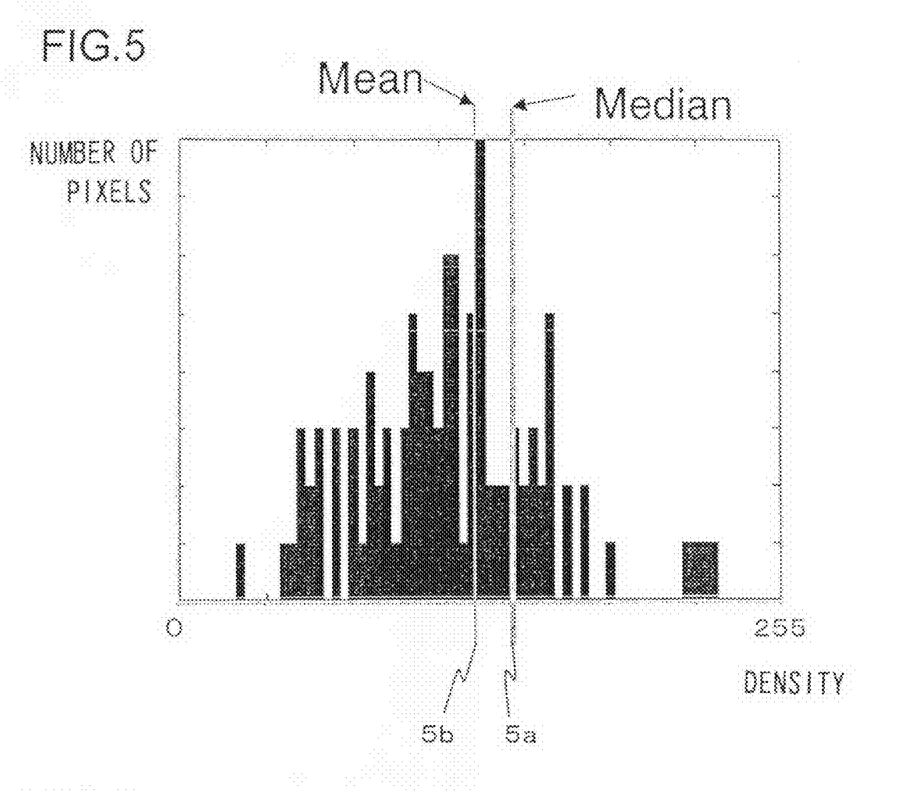
(FIG. 5) A figure showing an example of a density histogram generated based on the component images.

As a result, a density histogram, for example, as in FIG. 5 is obtained. The density histogram in FIG. 5 indicates either one of the Y image, Cb image, or Cr image. Density histograms that indicate the other two images are to be created likewise.

Figure 6:
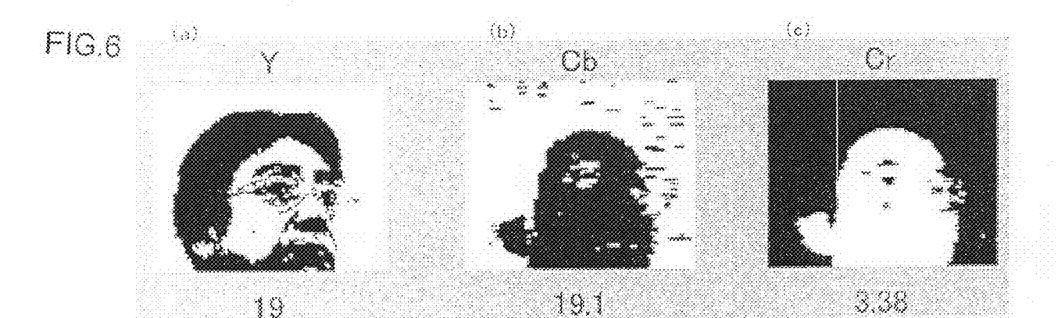
(FIG. 6) Figures showing examples of binary mask images generated by binarizing the component images.

The subject extracting device 104a calculates a density median 5a, that is, a median of the density histogram of each of the component images thus created. The subject extracting device 104a sets the density median 5a as a threshold value, then binarizes each of the Y image, the Cb image, and the Cr image so as to generate a binary mask image. Consequently, as shown in FIG. 6, a binary mask image is generated for each of the Y image, the Cb image, and the Cr image.

Specifically, the subject extracting device 104a binarizes the Y image in FIG. 4(a) by using the density median 5a of the Y image as a threshold value so as to generate a binary mask image of the Y image in FIG. 6(a). Likewise, the subject extracting device 104a binarizes the Cb image in FIG. 4(b) by using the density median 5a of the Cb image as a threshold value so as to generate a binary mask image of the Cb image in FIG. 6(b). Also, the subject extracting device 104a binarizes the Cr image in FIG. 4(c) by using the density median 5a of the Cr image as a threshold value so as to generate a binary mask image of the Cr image in FIG. 6(c).

It is to be noted that while the present embodiment includes an example in which the density median 5a is used as a threshold value for binarizing with respect to each of the Y image, the Cb image, and the Cr image, another value may instead be used as a threshold value. For instance, a density mean value 5b, a mean of the density histogram of each of the component images, may be used as a threshold value.

The subject extracting device 104a calculates the moment of inertia about the center of mass for each of the binary mask image of the Y image, the binary mask image of the Cb image, and the binary mask image of the Cr image. In other words, the subject extracting device 104a respectively calculates the moment of inertia about the center of mass for each of the binary mask image of the Y image, the moment of inertia about the center of mass for each of the binary mask image of the Cb image, and the moment of inertia about the center of mass for each of the binary mask image of the Cr image. A method for calculating the moment of inertia about the center of mass of binary images is known and therefore not detailed herein. In short, the moment of inertia about the center of mass is calculated by the sum of the square of the distance of pixel from the center of mass multiplied by the density value of 0 or 1.

The subject extracting device 104a selects a binary mask image whose moment of inertia about the center of mass is the minimum as a binary mask image for extracting subject, among the binary mask image of the Y image, the binary mask image of the Cb image, and the binary mask image of the Cr image. In other words, the subject extracting device 104a selects a binary mask image for extracting subject using the moment of inertia about the center of mass of the binary mask image of the Y image, the moment of inertia about the center of mass of the binary mask image of the Cb image, and the moment of inertia about the center of mass of the binary mask image of the Cr image, as an evaluation value.

Since each of the binary mask image of the Y image, the binary mask image of the Cb image, and the binary mask image of the Cr image has a value of "black: 0" and "white: 1", the moment of inertia about the center of mass of each of the images depends merely on the distance from the center of mass of a white pixel. In the case where white pixels densely exist around the center of mass, value of the moment of inertia about the center of mass is smaller. The binary mask image whose moment of inertia about the center of mass is the minimum is thus selected so as to select a binary mask image in which white pixels showing a subject exist more densely than in any other binary mask images.

In the example in FIG. 6, supposing that the moment of inertia of the binary mask image of the Y image is calculated as 19, the moment of inertia of the binary mask image of the Cb image is calculated as 19.1, and the moment of inertia of the binary mask image of the Cr image is calculated as 3.38, the subject extracting device 104a selects the binary mask image of the Cr image whose moment of inertia is the minimum as a binary mask image for extracting subject. Thus, as in FIG. 6(c), the subject extracting device 104a selects the binary mask image of the Cr image in which the subject is expressed in dense white regions and another region that corresponds to a background region is expressed in black as a binary mask image for extracting subject.

Figure 7:
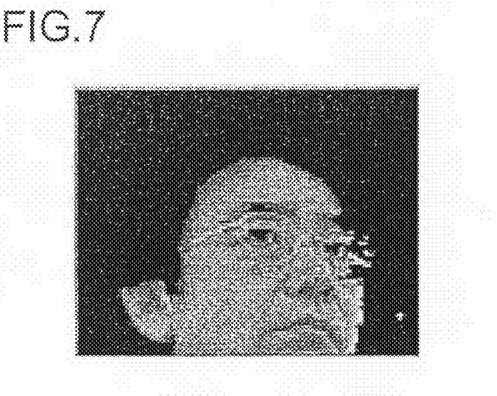
(FIG. 7) A figure showing an example of a template subject image.

The subject extracting device 104a performs a logical conjunction of a template image and a binary mask image for extracting subject so as to obtain a template subject image in which a background is eliminated from a template image and only a subject is extracted. Specifically, the subject extracting device 104a obtains the template subject image as in FIG. 7 in which the background is eliminated and only the image of person's face, that is, a subject image, is extracted by logical conjunction of the template image in FIG. 3 and the binary mask image for extracting subject shown in FIG. 6(c). The subject extracting device 104a stores the generated template subject image in the memory 105.

Each of the subject extracting device 104a, the template matching device 104b, and the subject tracking device 104c uses a template subject image thus generated from a template image so as to track the movement of a subject image between frames which exists in image data of each frame that makes up a moving image data (input image) input from the image sensor 103. Processing is performed as follows.

The subject extracting device 104a reads the template subject image which was generated in advance from the memory 105 in response to input of an image from the image sensor 103, and converts an image of each frame expressed in the RGB color system into the above-mentioned component images. Using either one of the equations (1) through (3), hereat, the subject extracting device 104a converts an image into a component image with the same component as in a binary mask image selected as a binary mask image for extracting subject when generating an template subject image by the above-mentioned processing, among the Y image, the Cb image, and the Cr image. Specifically, in the above-mentioned processing, since the binary mask image of the Cr image is selected as a binary mask image for extracting subject, an input image is converted into a Cr image using the equation (3).

Figure 2:
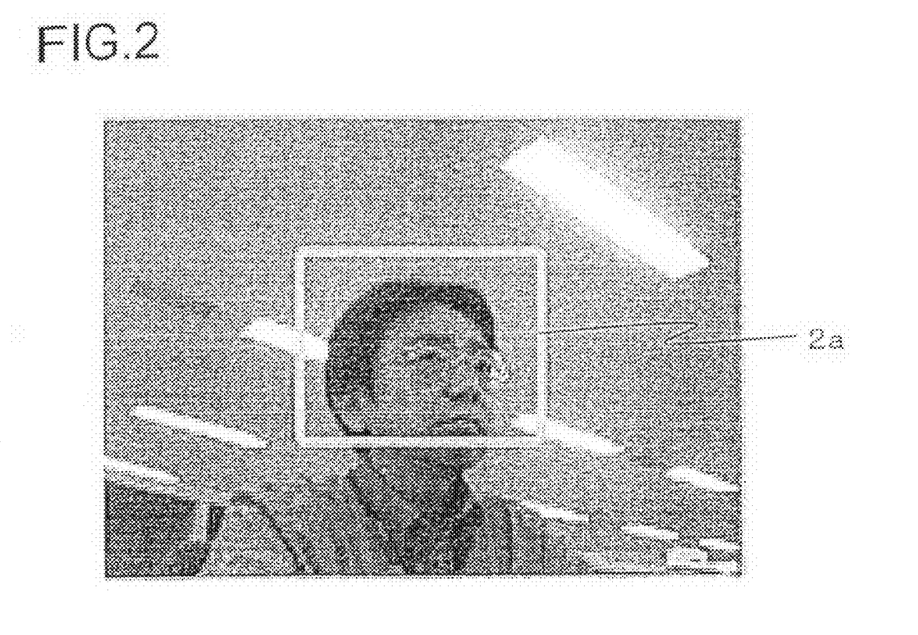
(FIG. 2) A figure showing an example of a view that includes a face of a person to be tracked.
Figure 8:
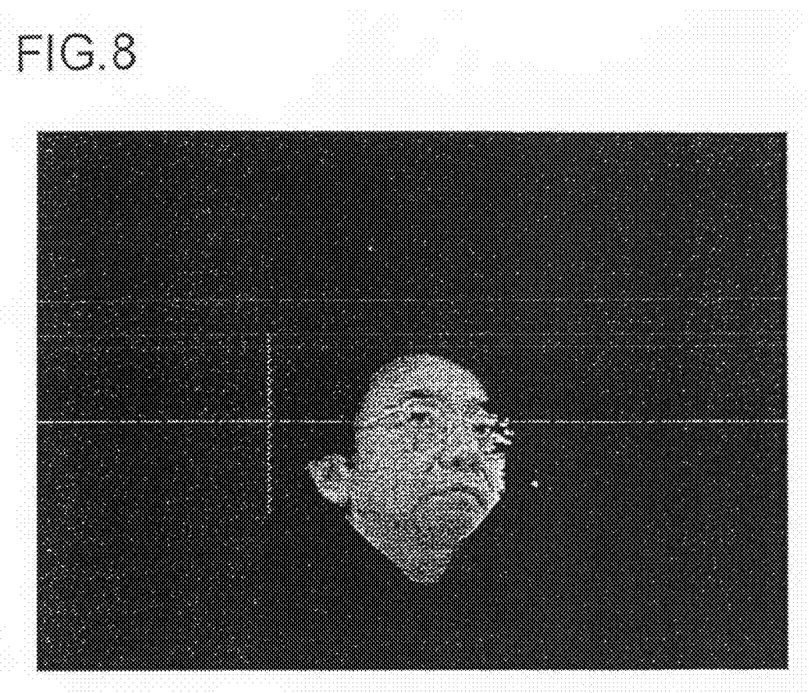
(FIG. 8) A figure showing an example of an input subject image.

The subject extracting device 104a performs the same processing as the processing for generating the template subject image on the generated Cr image so as to generate an input subject image in which a background is eliminated from an input image and only a subject image is extracted. In other words, the subject extracting device 104a creates a density histogram as in FIG. 5 according to the generated Cr image, and sets the density median 5a as a threshold value for binarizing the Cr image so as to generate a binary mask image of the Cr image. Setting the binary mask image of the Cr image as a binary mask image for extracting subject, the subject extracting device 104a performs a logical conjunction of an input image and a binary mask image for extracting subject so as to generate an input subject image in which a background is eliminated from an input image and only a subject image is extracted. In the case where a frame of an input image is the image as shown in FIG. 2, for example, an input subject image in FIG. 8 is generated.

The template matching device 104b sets a rectangular frame as a target region for matching to a template subject image on the generated input subject image. The template matching device 104b moves a position of the target region in the input subject image by a predetermined amount, for example, by one pixel and calculates a similarity between images in the target region for each position and the template subject image.

According to the present embodiment, the moment of inertia of a template subject image about the center of mass of the binary mask image (the binary mask image of the template subject image) used for generating the template subject image is taken as a feature quantity of the template subject image. The moment of inertia of an input subject image about the center of mass of a region corresponding to the target region of the binary mask image (the binary mask image of the input subject image) used for generating the input subject image is taken as a feature quantity of the input subject image. Similarity between the image in the target region and the template subject image is calculated according to the feature quantity of the template subject image and the feature quantity of the input subject image. A method disclosed in, for example, Japanese Laid Open Patent Publication No. 2005-293334 is adopted for calculating the similarity according to the both features, and not herein detailed.

The template matching device 104b specifies a region whose similarity to the template subject image is the highest in the input subject image after performing template matching processing to the whole input subject image. In other words, the template matching device 104b specifies the position of the target region when the highest similarity is calculated as a result of performing template matching processing by moving the position of the target region by the predetermined amount in the input subject image.

The subject tracking device 104c tracks the position of the target region specified by the template matching device 104b between frames so as to track the movement of the subject image in the moving image data input from the image sensor 103 between frames.

Figure 9:
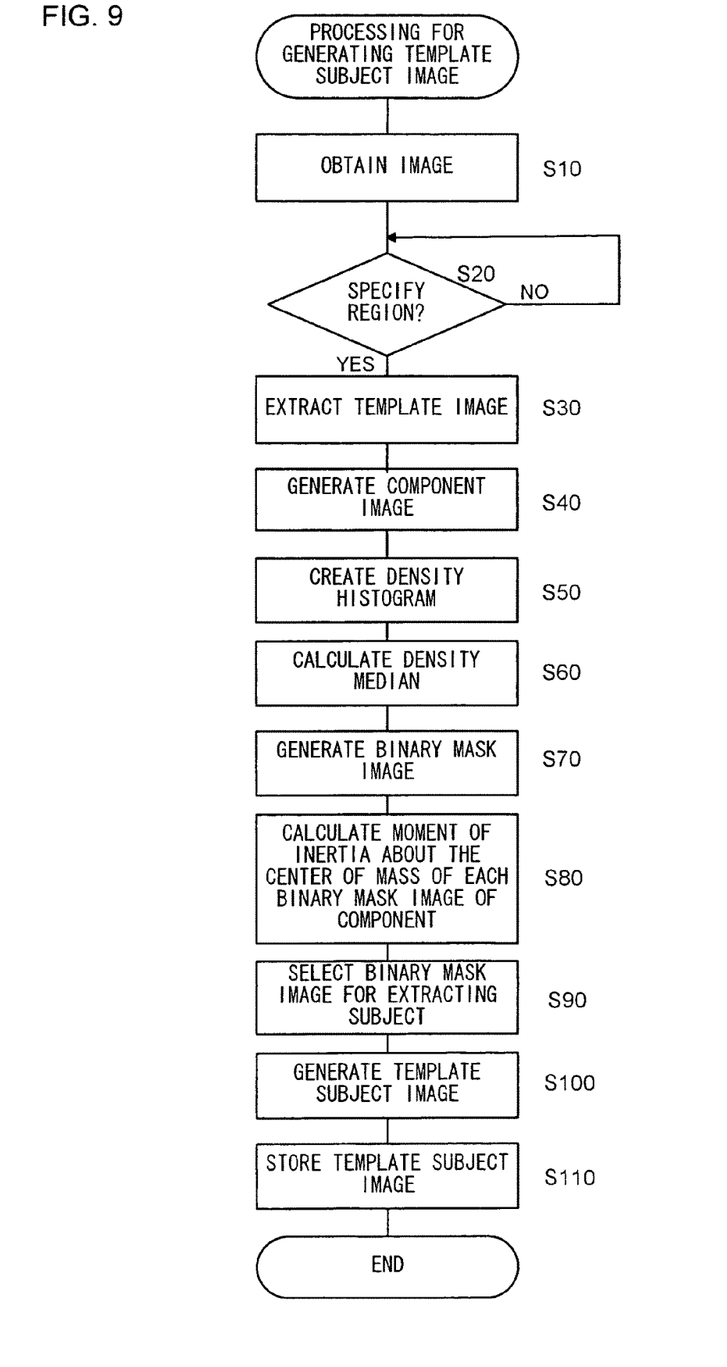
(FIG. 9) A flowchart of processing for generating a template subject image.

FIG. 9 is a flowchart of processing for generating a template subject image in accordance with the present embodiment. The processing in FIG. 9 is to be performed by the subject extracting device 104a as a program for extracting subject to run in response to an instruction for generating a template subject image caused by an operation of the input switch 101 by a user.

In step S10, the subject extracting device 104a obtains an image in which a subject image is captured by, for instance, reading an image stored in the memory card in the memory card slot 106 or by obtaining a new image through the image sensor 103. Then, in step S20, the subject extracting device 104*a* determines whether or not a region to be extracted for a template image is specified in the obtained image by a user. When the subject extracting device 104*a* determines that the region is specified, the processing proceeds to step S30.

In step S30, the subject extracting device 104*a* extracts an image in the region specified by the user as a template image. Then the processing proceeds to step S40. In step S40, the subject extracting device 104*a* generates component images, i.e., a Y image, a Cb image, and a Cr image respectively from the template image using the equations (1) through (3). Then the processing proceeds to step S50. In step S50, the subject extracting device 104*a* creates a density histogram as in FIG. 5 for each of the Y image, the Cb image, and the Cr image. Then the processing proceeds to step S60.

In step S60, the subject extracting device 104*a* calculates a density median 5*a* of the density histogram of each of the component images. Then the processing proceeds to step S70. In step S70, the subject extracting device 104*a* sets the density median 5*a* as a threshold value and binarizes each of the Y image, the Cb image, and the Cr image so as to generate a binary mask image of each of the components. Then the processing proceeds to step S80. In step S80, the subject extracting device 104*a* calculates a moment of inertia about the center of mass for each of the binary mask image of the Y image, the binary mask image of the Cb image, and the binary mask image of the Cr image. Then the processing proceeds to step S90.

In step S90, the subject extracting device 104*a* selects a binary mask image whose moment of inertia about the center of mass is the minimum as a binary mask image for extracting subject among the binary mask image of the Y image, the binary mask image of the Cb image, and the binary mask image of the Cr image. Then the processing proceeds to step S100. In step S100, the subject extracting device 104*a* performs a logical conjunction of the template image and the binary mask image for extracting subject so as to generate a template subject image. Then the processing proceeds to step S10. In step S110, the subject extracting device 104*a* stores the generated template subject image in the memory 105 and the processing terminates.

Figure 10:
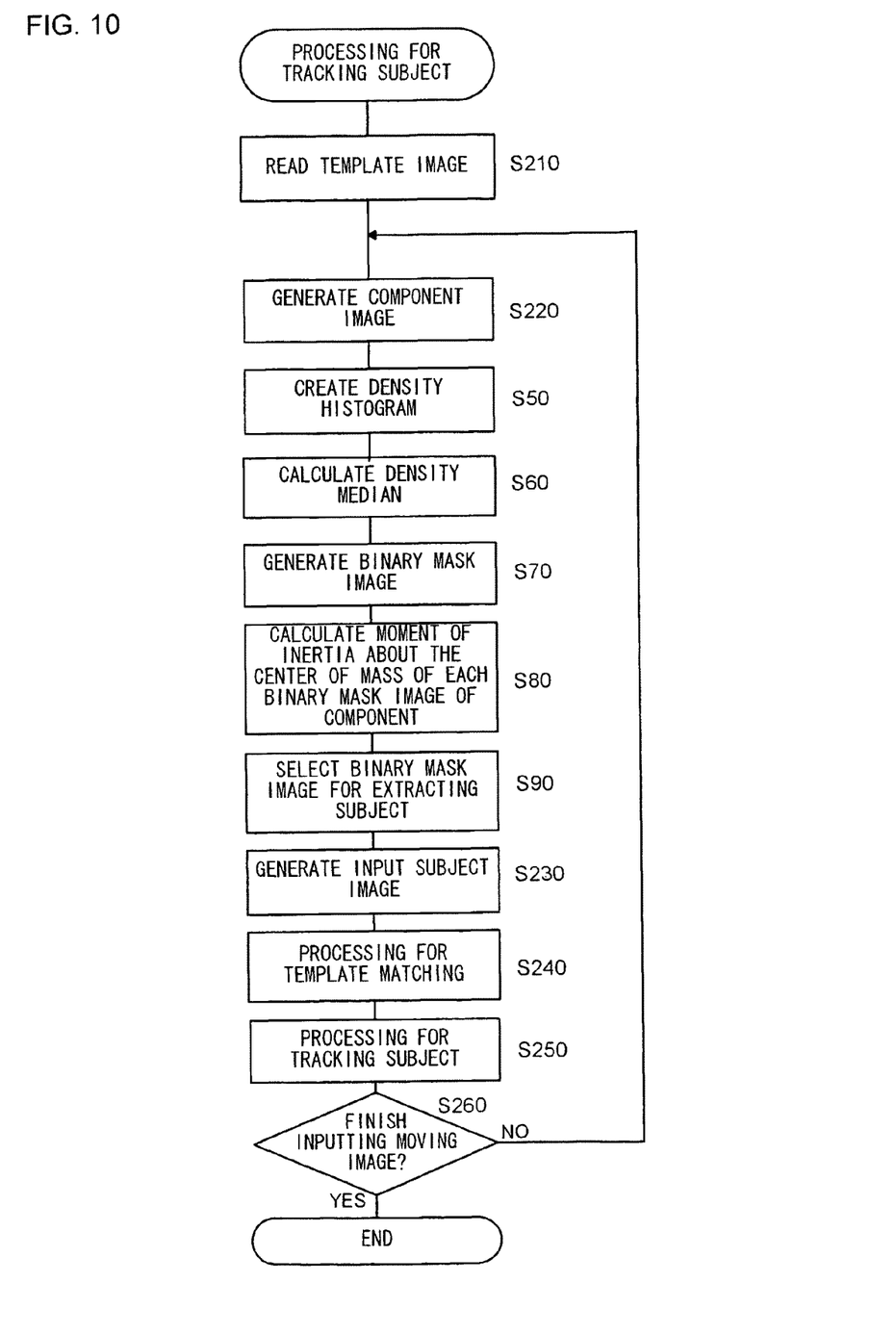
(FIG. 10) A flowchart of processing for tracking a subject.

FIG. 10 is a flowchart of processing for tracking a subject in accordance with the present embodiment. The processing in FIG. 10 is to be performed by the control unit 104 as a program for tracking subject to run in response to a start of shooting of a moving image caused by an operation of the input switch 101 by a user. The same step number as in FIG. 9 is given to a step in FIG. 10 which performs the same processing as that for generating template subject image shown in FIG. 9. Differences are now explained.

In step S210, the subject extracting device 104*a* reads the template subject image reproduced by the processing in FIG. 9 from the memory 105. Then the processing proceeds to step S220. In step S220, according to an input image, the subject extracting device 104*a* generates a component image whose component is the same as that of the binary mask image selected as a binary mask image for extracting subject in step S90 of FIG. 9, using either one of the equations (1) through (3). Then the processing proceeds to step S50.

In step S230, the subject extracting device 104*a* performs a logical conjunction of the input image and the binary mask image for extracting subject so as to generate an input subject image in which a background is eliminated from the input image and only a subject image is extracted. Then the processing proceeds to step S240. In step S240, the template matching device 104*b*, as described above, calculates the similarity between the image in the target region set in the input subject image and the template subject image so as to perform the template matching processing. The template matching device 104*b* then specifies the position of the target region whose similarity to the template subject image is the highest in the input subject image. Then the processing proceeds to step S250.

In step S250, the subject tracking device 104*c* tracks the position of the target region specified by the template matching device 104*b* between frames and tracks the movement of the subject image in the moving image data input from the image sensor 103. Then the processing proceeds to step S260. In step S260, it is determined whether or not input of the moving image data from the image sensor 103 is finished, in other words, whether or not shooting of the moving image is finished. When it is determined that the shooting of the moving image data is not finished, the processing returns to step S220. When it is determined that, on the other hand, the shooting of the moving image is finished, the processing terminates.

The following operational effects can be achieved in accordance with the embodiment described above.

(1) A template image, that is, an image to be processed, is extracted from an image that includes a subject image to be tracked. The template image is converted into each component image including a Y image, a Cb image, and a Cr image. Then, each of the component images is binarized by a density median as a threshold value. A binary mask image whose moment of inertia about the center of mass is the minimum is to be selected as a binary mask image for extracting subject among the binary mask image of the Y image, the binary mask image of the Cb image, and the binary mask image of the Cr image. Thus, in the binary mask image whose moment of inertia about the center of mass is the minimum, white regions densely exist around the center of mass. The most appropriate binary mask image for extracting subject can be selected in the light of the fact that the subject image often exists around the center of mass of the image.

(2) A template subject image in which a background is eliminated from the template image and only a subject image is extracted is to be generated by performing a logical conjunction of the template image and a binary mask image for extracting subject. Thus, in the binary mask image for extracting subject, an area corresponding to the subject image is expressed as a white region and other background region is expressed as a black region. The template subject image in which the background is eliminated and the subject image is extracted highly accurately can thus be generated by performing a logical conjunction of the binary mask image for extracting subject and the template image.

(3) With respect to generating an input subject image from an input image, other processings are to be performed after the input image is converted into a component image whose component is the same as the binary mask image selected as a binary mask image for extracting subject when the template subject image is generated. This limits an image to be processed only to the component image whose component is the same as the binary mask image selected for generating the template subject image, and therefore reduces the processing load and improves the processing speed.

(4) As a result of performing the template matching processing to the whole input subject image, the movement of the subject image is to be tracked by specifying a region whose similarity to the template subject image is the highest in the input subject image and tracking the position of the specified target region between frames. The movement of the subject image can thus be tracked between frames with high precision.

Examples of Variations

The camera according to the embodiment described above can be varied as follows.

(1) In the embodiment described above, a template image expressed in the RGB color system and an input image are converted into a luminance image, which includes luminance components in the YCbCr color space, and a chrominance image, which includes chrominance components. However, the template image and the input image may be converted into a luminance image, which includes luminance components in the YIQ color space, and a chrominance image, which includes chrominance components.

(2) In the embodiment described above, the subject extracting device 104a generates a subject image from each of a template image and an input image, the template matching device 104b performs template matching processing using the extraction result, and the subject tracking device 104c tracks the movement of the subject image between frames. However, an image may be synthesized using a subject image extracted from an image by the subject extracting device 104a. For example, in the case where there are two images including a source image for synthesizing and a destination image for synthesizing, the subject extracting device 104a performs subject extracting processing to each of the source image for synthesizing and the destination image for synthesizing so as to generate a subject image from each of the images. A subject image generated from the source image for synthesizing may be synthesized in the extraction position of the subject image in the destination image for synthesizing after specifying the extraction position for the subject image in the destination image for synthesizing.

(3) In the embodiment described above, processing is performed to moving image data input from the image sensor 103, in other words, image data of a plurality of frames continuously input, so as to track the subject image between frames. However, in the case where still images are serially input for a plurality of frames by a continuous shooting function, the present invention is applicable to tracking of the movement of the subject image between frames.

(4) In the embodiment described above, the moment of inertia about the center of mass is calculated for each of the binary mask image of the Y image, the binary mask image of the Cb image, and the binary mask image of the Cr image. The binary mask image whose moment of inertia about the center of mass is the minimum is selected as a binary mask image for extracting subject. In the embodiment described above, in other words, the moments of inertia about the center of mass of the binary mask images of each of the components are used as an evaluation value for selecting a binary mask image for extracting subject. However, the present invention is not limited to this example. Area of white region may be respectively calculated for the binary mask images of each of the components, so as to select the binary mask image whose evaluation value, which is calculated by the following equation (4), is the minimum as a binary mask image for extracting subject among the binary mask images of each of the components.

Evaluation value=Area of white region/Moment of inertia about the center of mass (4)

This prevents a binary mask image in which a small white region different from the subject image exists around the center of mass of the image from being mischosen for a binary mask image for extracting subject.

(5) In the embodiment described above, a subject extracted from an image by subject extracting processing is to be tracked between frames. In other words, the subject extracting processing is performed for subject tracking processing. However, the subject extracting processing can be applied to other purposes. After a subject is extracted from an image by the subject extracting processing, for instance, a background other than the extracted subject in the image may be put digitally out of focus. That is, the subject extracting processing may be performed for digital blur or bokeh.

(6) In the embodiment described above, the control unit 104, which is included in the camera 100, performs processings in the subject extracting device 104a, the template matching device 104b, and the subject tracking device 104c. However, the present invention is not limited to this example and a program for executing processings equivalent to those in the devices 104a through the 104c may be stored in a terminal such as a personal computer so as to perform the processings in the terminal. In this instance, data of an image photographed by a camera may be loaded to the terminal so as to be subjected to the processings. The present invention may be applied to a camera cell-phone and the like. Only a program for extracting subject for performing processing equivalent to that in the subject extracting device 104a may be stored in other terminal so as to perform only subject extracting processing in which a background is eliminated from an image and only a subject image is extracted.

Figure 11:
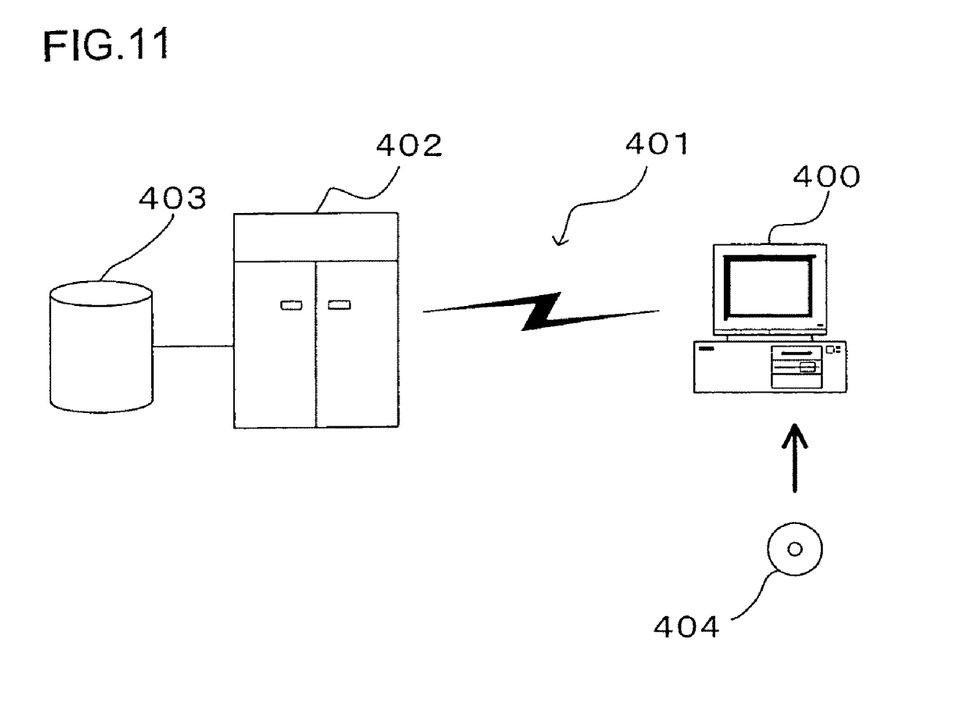
(FIG. 11) A schematic diagram illustrating a computer program for tracking a subject being provided to a subject tracking device.

(7) In the case of applying to a personal computer and the like, programs such as the program for extracting subject, program for tracking subject, etc. may be provided through a recording medium including a CD-ROM and the like or data signal including the Internet and the like, as illustrated in FIG. 11. A personal computer 400 is provided with a program via a CD-ROM 404. The personal computer 400 includes a function of connection to a communication line 401. A computer 402 is a server computer that provides programs such as the program for extracting subject, program for tracking subject, etc. The computer 402 stores these programs in a recording medium such as a hard disk 403. The communication line 401 includes the Internet, a communication line such as PC communication, and a leased line. The computer 402 reads the program using the hard disk 403 and sends the program to the personal computer 400 through the communication line 401. In other words, the computer 402 embodies the program on a carrier wave as a data signal and sends it via the communication line 401. The program can thus be provided as a computer-readable computer program product in various forms such as a recording medium, a carrier wave, and the like.

While the invention has been particularly shown and described with respect to preferred embodiments thereof by referring to the attached drawings, the present invention is not limited to these examples and it will be understood by those skilled in the art that various changes in form and detail may be made therein without departing from the scope and teaching of the invention.

The disclosures of the following priority application is herein incorporated by reference:

Japanese Patent Application No. 2006-125202 (filed Apr. 28, 2006)

The invention claimed is:

1. A subject extracting method, comprising:
processing a pre-processed image represented in an RGB color space to generate a luminance image including luminance components and a chrominance image including chrominance components;
generating binary mask images for extracting a subject by binarizing each of the luminance image and the chrominance image with a predefined threshold value;
determining one binary mask image selected using a predetermined evaluation value from a binary mask image of the luminance image and a binary mask image of the chrominance image as the binary mask image for extracting the subject; and
based on the pre-processed image and the determined binary mask image, generating a subject image in which only the subject included in the pre-processed image is extracted by eliminating a background region from the pre-processed image.

2. A subject extracting method according to claim 1, wherein:
the binary mask images are generated with one of a density mean value and a density median of the processed images as the predefined threshold value.

3. A subject extracting method according to claim 1, wherein:
a color space comprising the luminance components and the chrominance components is a YCbCr color space.

4. A subject extracting method according to claim 1, wherein:
a color space comprising the luminance components and the chrominance components is a YIQ color space.

5. A subject extracting method according to claim 1, wherein:
the predetermined evaluation value comprises a moment of inertia about a center of mass of the binary mask image of the luminance image and a moment of inertia about a center of mass of the binary mask image of the chrominance image.

6. A subject extracting method according to claim 1, wherein:
the predetermined evaluation value comprises a value obtained by dividing an area of white region in the luminance image by a moment of inertia about a center of mass of the binary mask image of the luminance image and a value obtained by dividing an area of white region in the chrominance image by a moment of inertia about a center of mass of the binary mask image of the chrominance image.

7. A subject extracting method according to claim 1, wherein:
the subject image is an image obtained by a logical conjunction of the pre-processed image and the binary mask image for extracting the subject.

8. A subject tracking method, comprising:
generating an input subject image in which only a subject included in an input image is extracted by eliminating a background from each frame of the input image using a subject extracting method according to claim 1; and
tracking a movement of a subject between frames in the input image according to similarity between a template image and the input subject image.

9. A subject tracking method, comprising:
generating a template subject image in which only a subject included in a template image is extracted by eliminating a background from the template image using a subject extracting method according to claim 1;
generating an input subject image in which only a subject included in an input image is extracted by eliminating a background from each frame of the input image using said subject extracting method; and
tracking a movement of the subject between frames in the input image according to similarity between the template subject image and the input subject image.

10. A subject tracking method according to claim 9, comprising:
the template image being an image represented in an RGB color space;
generating a luminance image including luminance components and a chrominance image including chrominance components according to the template image;
generating a binary mask image by binarizing the luminance image and the chrominance image with one of a density mean value and a density median of each of the luminance image and the chrominance image as a threshold value;
selecting one binary mask image using a predetermined evaluation value from a binary mask image of the luminance image and a binary mask image of the chrominance image as a binary mask image for template; and
determining an image obtained by a logical conjunction of the template image and the binary mask image for template as the template subject image.

11. A subject tracking method according to claim 10, comprising:
the input image being an image represented in an RGB color space;
generating a component image including a same component as in a binary mask image selected as the binary mask image for template based on the input image;
generating a binary mask image for input image by binarizing the component image with one of a density mean value and a density median of the component image as a threshold value; and
determining an image obtained by a logical conjunction of the input image and the binary mask image for input image as the input subject image.

12. A subject tracking method according to claim 11, comprising:
determining a moment of inertia of the template subject image about a center of mass of the binary mask image for template as a feature quantity for the template subject image;
determining a moment of inertia of the input subject image about a center of mass of a predetermined region set in the binary mask image for input image as a feature quantity of the input subject image; and
calculating a similarity between the template subject image and the input subject image based on the feature quantity of the template subject image and the feature quantity of the input subject image.

13. An image synthesizing method, comprising:
specifying an extraction position of a subject in a first image extracted from the first image using a subject extracting method according to claim 1 in the first image;
generating a subject image in which only a subject is extracted from a second image using said subject extracting method; and
synthesizing the subject image generated from the second image into the extraction position of the subject in the first image.

14. A non-transitory computer-readable medium storing a computer program for extracting a subject to be performed by a computer, the computer program comprising:
- a binary mask image generation step that generates a binary mask image for extracting a subject by binarizing an image after image-processing (processed image) using a predetermined threshold value;
- a subject image generation step that generates, based on an image before image-processing (pre-processing image) and the binary mask image for extracting the subject, a subject image in which a background region is eliminated from the pre-processing image and only the subject included in the pre-processing image is extracted;
- the pre-processing image is an image represented in an RGB color space; and
- the binary mask image generation step includes:
  - generating a luminance image including luminance components and a chrominance image including chrominance components based on the pre-processing image;,
  - generating the binary mask image with the luminance image and the chrominance image as the processed image respectively; and
  - determining one binary mask image selected using a predetermined evaluation value from a binary mask image of the luminance image and a binary mask image of the chrominance image as the binary mask image for extracting the subject.

15. A non-transitory computer-readable medium storing a computer program for extracting a subject according to claim 14, wherein:
- in the binary mask image generation step, the binary mask image is generated using one of a density mean value and a density median of the processed image as the predetermined threshold value.

16. A non-transitory computer-readable medium storing a computer program for extracting a subject according to claim 14, wherein:
- a color space comprising the luminance components and the chrominance components is a YCbCr color space.

17. A non-transitory computer-readable medium storing a computer program for extracting a subject according to claim 14, wherein:
- a color space comprising the luminance components and the chrominance components is a YIQ color space.

18. A non-transitory computer-readable medium storing a computer program for extracting a subject according to claim 14, wherein:
- the predetermined evaluation value comprises a moment of inertia about a center of mass of the binary mask image of the luminance image and a moment of inertia about a center of mass of the binary mask image of the chrominance image.

19. A non-transitory computer-readable medium storing a computer program for extracting a subject according to claim 14, wherein:
- the predetermined evaluation value comprises a value obtained by dividing an area of white region in the luminance image by a moment of inertia about a center of mass of the binary mask image of the luminance image and a value obtained by dividing an area of white region in the chrominance image by a moment of inertia about a center of mass of the binary mask image of the chrominance image.

20. A non-transitory computer-readable medium storing a computer program for extracting a subject according to claim 14, wherein:
- in the subject image generation step, an image obtained by a logical conjunction of the pre-processing image and the binary mask image for extracting the subject is determined as the subject image.

21. A non-transitory computer-readable medium storing a computer program according to claim 14, wherein the program also is for tracking subject,
- wherein an input subject image generation step extracts the subject to generate an input subject image in which a background is eliminated from each frame of an input image and only a subject included in the input image is extracted; and
- further comprising a subject tracking step that tracks a movement of the subject between frames in the input image based on a similarity between a template image and the input subject image.

22. A non-transitory computer-readable medium storing a computer program according to claim 14 wherein the program also is for tracking a subject,
- wherein a template subject image generation step extracts the subject to generate a template subject image in which a background is eliminated from template image and only a subject included in the template image is extracted; and further comprising:
- an input subject image generation step that performs said computer program for extracting ~ the subject so as to generate an input subject image in which a background is eliminated from each frame of an input image and only the subject included in the input image is extracted; and
- a subject tracking step that tracks a movement of the subject between frames in the input image based on a similarity between the template subject image and the input subject image.

23. A non-transitory computer-readable medium storing a computer program for tracking a subject according to claim 22, wherein:
- the template image is an image represented in an RGB color space; and
- the template subject image generation step includes:
  - generating a luminance image including luminance components and a chrominance image including chrominance components based on the template image;
  - generating a binary mask image by binarizing the luminance image and the chrominance image with one of a density mean value and a density median of each of the luminance image and the chrominance image as a threshold value;
  - selecting one binary mask image as a binary mask image for template using a predetermined evaluation value from a binary mask image of the luminance image and a binary mask image of the chrominance image; and
  - determining an image obtained by a logical conjunction of the template image and the binary mask image for template as the template subject image.

24. A non-transitory computer-readable medium storing a computer program for tracking a subject according to claim 23, wherein:
- the input image is an image represented in an RGB color space; and
- the input subject image generation step include:
  - generating a component image including a same component as in a binary mask image selected as the binary mask image for template based on the input image;
  - generating a binary mask image for input image by binarizing the component image with one of a density mean value and a density median of the component image as a threshold value; and determining an image obtained by a logical conjunction of the input image and the binary mask image for input image as the input subject image.

25. A non-transitory computer-readable medium storing a computer program for tracking a subject according to claim 24, wherein:

the subject tracking step includes:

determining a moment of inertia of the template subject image about a center of mass of the binary mask image of the template is a feature quantity for the template subject image;

determining a moment of inertia of the input subject image about a center of mass of a predetermined region set in the binary mask image for input image as a feature quantity of the input subject image; and calculating a similarity between the template subject image and the input subject image based on the feature quantity of the template subject image and the feature quantity of the input subject image.

26. A non-transitory computer-readable medium storing a computer program according to claim 14, wherein the program also is for synthesizing images, wherein a specifying step extracts the image to specify an extraction position of a subject extracted from a first image in the first image; and further comprising:

a subject image generation step that performs said computer program for extracting a subject so as to generate a subject image in which only the subject is extracted from a second image; and a synthesizing step that synthesizes the subject image generated from the second image into the extraction position of the subject in the first image.

27. A subject extracting device, comprising:

a program execution device that performs a computer program stored in a non-transitory computer-readable medium for extracting a subject according to claim 14.

28. A subject tracking device, comprising:

a program execution device that performs a computer program stored in a non-transitory computer-readable medium for tracking a subject according to claim 21.

29. An image synthesizing device, comprising:

a program execution device that performs a computer program stored in a non-transitory computer-readable medium for synthesizing images according to claim 26.

* * * * *